United States Patent [19]

Kazaoka et al.

[11] Patent Number: 4,619,548

[45] Date of Patent: Oct. 28, 1986

[54] TELESCOPIC SHAFT

[75] Inventors: Kenichi Kazaoka; Masanobu Ishikawa; Masumi Nishikawa, all of Aichi, Japan

[73] Assignee: Aisin Seiki Kabushiki Kaisha, Kariya, Japan

[21] Appl. No.: 700,132

[22] Filed: Feb. 8, 1985

[30] Foreign Application Priority Data

Mar. 5, 1984 [JP] Japan ............................... 59-042492

[51] Int. Cl.[4] ............................ F16B 2/02; F16B 7/00

[52] U.S. Cl. .................................... 403/290; 403/359; 403/377; 74/493

[58] Field of Search ............... 403/290, 104, 374, 248, 403/110, 109, 377, 359, 350; 74/493, 531; 248/118.5, 411

[56] References Cited

U.S. PATENT DOCUMENTS

| | | | |
|---|---|---|---|
| 534,152 | 2/1895 | Heinkel et al. | 403/290 |
| 1,301,475 | 4/1919 | Mellin | 403/104 |
| 1,428,601 | 9/1922 | McGuckin | 403/290 |
| 2,947,556 | 8/1960 | Wenger | 403/290 |
| 3,276,287 | 10/1966 | Albrecht | 74/493 |
| 3,318,170 | 5/1967 | Runkel . | |
| 3,380,097 | 4/1968 | Pharris | 403/359 |
| 3,434,368 | 3/1969 | Runkel . | |
| 3,434,369 | 3/1969 | Runkel . | |
| 4,068,858 | 1/1978 | Harrison et al. | 403/290 |
| 4,379,707 | 4/1983 | Fisher | 403/359 |
| 4,402,236 | 9/1983 | Nishikawa | 74/493 |
| 4,463,625 | 8/1984 | Nishikawa | 403/374 |
| 4,524,484 | 6/1985 | Graham | 403/104 |

*Primary Examiner*—Cornelius J. Husar
*Assistant Examiner*—Peter M. Cuomo
*Attorney, Agent, or Firm*—Finnegan, Henderson, Farabow, Garrett & Dunner

[57] ABSTRACT

A telescopic shaft includes an outer shaft, a first spline on the outer shaft, an inner shaft, a second spline on the inner shaft for engagement with the first spline, a threaded nut for depressing a threaded end portion of the outer shaft against the inner shaft, and a rod with a tapered end for depressing a tapered end portion of the inner shaft against the outer shaft.

10 Claims, 4 Drawing Figures

TELESCOPIC SHAFT

BACKGROUND OF THE INVENTION

1. Field of the Invention

The present invention relates to a telescopic shaft in which an inner shaft is axially spline fitted within an outer shaft.

2. Description of the Prior Art

Conventional telescopic shafts are shown in U.S. Pat. Nos. 3,318,170, 3,434,369 and 3,434,368. In U.S. Pat. No. 3,434,368, an inner shaft is telescopically disposed within an outer shaft. The two shafts are connected by an axially extending serration or spline arrangement to prevent relative rotation. The shafts may be fixed at a desired position to prevent relative axial translation by depressing an outer circumferential surface of an end portion of the inner shaft against an inner circumferential surface of the outer shaft. U.S. Pat. No. 3,318,170 shows a telescopic shaft arrangement in which a sliding unit is provided near the end of one shaft and is depressed against the other shaft by an elastic member.

Splined shafts are constructed so that there is clearance between the mating portions when assembled to allow the shafts to slide without binding. However this clearance causes lost motion between the shafts. The known arrangements prevent some torsional lost motion between the inner and outer shafts but are ineffective in completely preventing all lost motion between the shafts in the torsional and bending directions.

An object of the present invention, therefore, is to provide an improved telescopic shaft which obviates the aforementioned drawbacks of the described conventional telescopic shaft by completely preventing all lost motion between the inner and outer shafts in the torsional and bending directions.

A further object of the present invention is to provide an improved telescopic shaft which is suitable for a main shaft of a telescopic steering column for vehicles.

A still further object of the present invention is to provide an improved telescopic shaft which can be moved reliably in a relatively simple manner.

Additional objects and advantages of the invention will be set forth in the description which follows and in part will be obvious from the description, as may be learned by practice of the invention.

SUMMARY OF THE INVENTION

To achieve the foregoing objects, and in accordance with the purposes of the invention as embodied and broadly described herein, a telescopic shaft is provided comprising an outer shaft, the outer shaft having first and second end portions; first spline means on the outer shaft; an inner shaft, the inner shaft having first and second end portions; second spline means on the inner shaft for engagement with the first spline means; first depressing means for depressing the first end portion of the outer shaft against the inner shaft; and second depressing means for depressing the first end portion of the inner shaft against the outer shaft.

It is preferable to have a male screw means formed on the first end portion of the outer shaft, the male screw means having a tapered shape and axial slit means symmetrically provided around the circumference of the male screw means and formed through the whole length of the male screw means, and first annular groove means formed on a root portion of the male screw means for decreasing the bending resistance of the male screw means. The annular groove means is preferably in the inner circumferential surface of the outer shaft.

It is further preferable that the first end portion of the inner shaft includes an axially tapered hole portion having a plurality of axial slit means symmetrically provided around the circumference of the tapered hole portion and formed through the whole length of the tapered hole portion, and second annular groove means formed on a root portion of the tapered hole portion for decreasing the bending resistance of the tapered hole portion. The second annular groove means is preferably in the inner circumferential surface of the inner shaft.

It is still further preferable that the first depressing means includes a nut means for accommodating the male screw means and that the second depressing means includes a rod, the inner shaft including an inner circumferential surface for accommodating the rod, the rod having first and second ends, the first end of the rod including a tapered portion means for engaging the tapered hole portion of the inner shaft, wherein the second end of the rod includes a male screw portion, the inner circumferential portion of the inner shaft including a female screw portion means for accommodating the male screw portion of the rod.

BRIEF DESCRIPTION OF THE DRAWINGS

The accompanying drawings which are incorporated in and constitute a part of the specification, illustrate a preferred embodiment of the invention and, together with the general description of the invention given above and the detailed description of the preferred embodiment given below, serve to explain the principles of the invention.

DETAILED DESCRIPTION OF THE PREFERRED EMBODIMENT

Reference will now be made in detail to the present preferred embodiment of the invention as illustrated in the accompanying drawings.

In accordance with the invention, the telescopic shaft comprises an outer shaft having a first inserted end portion and a second end portion, first spline means on the outer shaft, an inner shaft having a first inserting end portion and a second end portion, and a second spline means on the inner shaft for engagement with the first spline means.

Figure 1:
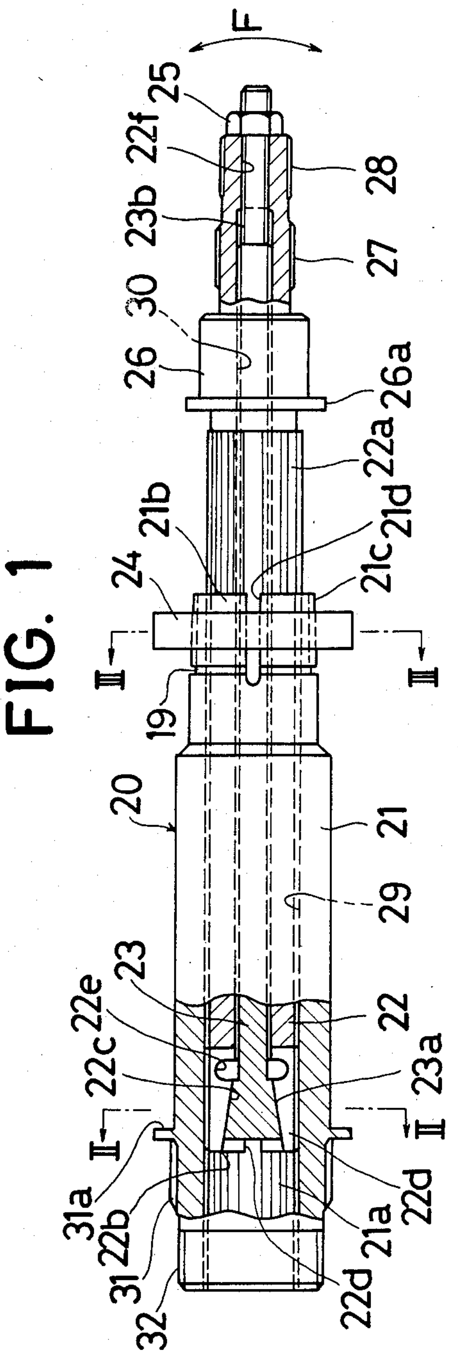
FIG. 1 is a side elevational view in partial cross section of a telescopic shaft incorporating the teachings of the present invention.

As embodied and depicted in FIG. 1, telescopic shaft 20 includes outer shaft 21 and inner shaft 22. Outer shaft 21 is substantially cylindrical in shape and has a first spline means **21*a* on an inner circumferential surface 29. Inner shaft 22 is substantially cylindrical in shape and has second spline means 22*a* on an outer circumferential surface which is engageable with first spline means 21*a* of outer shaft 21. Inner shaft 22 is slidably inserted into outer shaft 21 and shafts 21, 22 are integrally rotatable by first and second spline means 21*a* and 22*a***.

Figure 3:
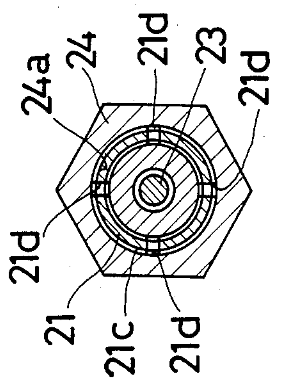
FIG. 3 is a sectional view taken along the line III—III in FIG. 1.
Figure 2:
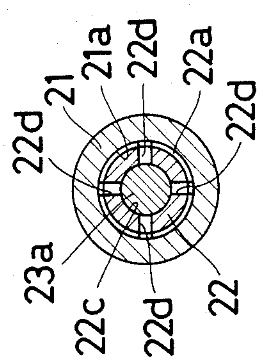
FIG. 2 is a sectional view taken along the line II—II in FIG. 1.
Figure 4:
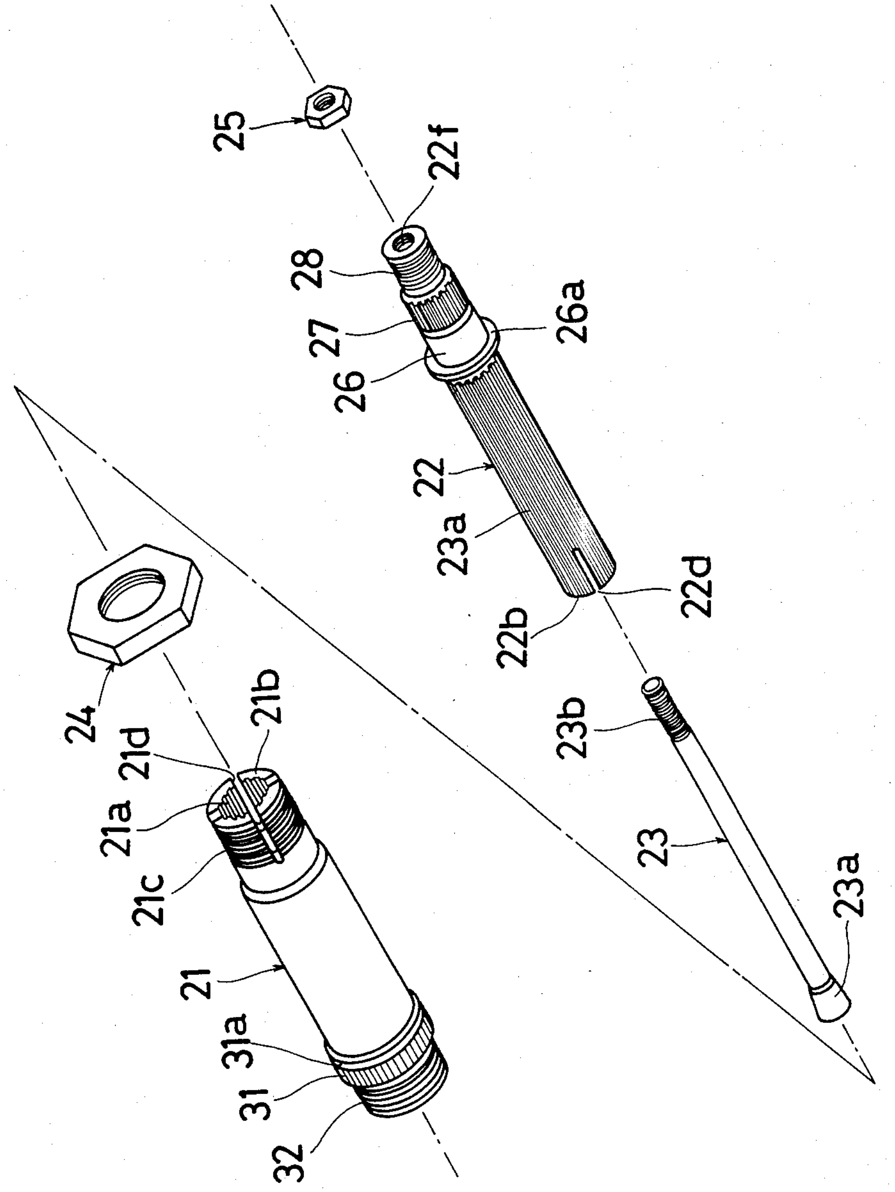
FIG. 4 is an exploded perspective view of the embodiment shown in FIG. 1.

A male screw means 21c, having a tapered shape, is formed at a first inserted end portion 21b of outer shaft 21, in which inner shaft 22 is inserted. A plurality of axial slit means such as four slits 21d are axially and symmetrically provided in male screw means 21c as shown in FIG. 3. Each slit 21d is formed through the whole length of the male screw means 21c, so that the male screw means 21c is elastically deformable. Further, the male screw means 21c is thin. A first annular groove means 19 is formed at the root portion of male screw means 21c on an inner circumferential surface 29 of outer shaft 21. Accordingly, the male screw means 21c is easily inwardly bent from the root portion.

A tapered hole portion 22c is provided at a first inserting end portion 22b of the inner shaft 22. A plurality of axial slit means such as four slits 22d are axially and symmetrically provided at tapered hole portion 22c throughout the length of the hole. A second annular groove means 22e is formed at the tapered hole portion 22c on a cylindrical inner circumferential surface 30 of inner shaft 22. Accordingly, the tapered hole portion 22c is elastically and uniformly deformable through the whole of the circumference.

In accordance with the invention, the telescopic shaft includes a first depressinq means for depressing the first inserted end portion of the outer shaft against the inner shaft. As embodied in FIG. 1, a first depressing means includes a threaded nut means 24 which is screwed on male screw means 21c. Male screw means 21c has a tapered shape and is elastically deformable, so that male screw means 21c is inwardly deformed by tightening nut means 24 so that it progresses toward the root of male screw means 21c. First spline means 21a of the inner circumferential portion of the male screw means 21c is put in close contact with second spline means 22a of the outer circumferential surface of the inner shaft 22 at a selected position.

In accordance with the invention, the telescopic shaft includes a second depressing means for depressing the first inserting end portion of the inner shaft against the outer shaft. As embodied in FIG. 1, a second depressing means includes rod 23 which is inserted into a cylindrical inner circumferential surface 30 of inner shaft 22. As further shown in FIG. 1, a tapered portion means 23a is formed at the left end of the rod 23 for engagement with tapered hole portion 22c of inner shaft 22. A male screw portion 23b is provided at the outer circumferential surface of the right end of rod 23 and is screwed into a female screw portion means 22f formed on the right end of the inner circumferential surface 30 of the inner shaft 22. Male screw portion 23b is screwed into female screw portion means 22f by rotating rod 23 so that male screw portion 23b moves to the right relative to female screw portion means 22f as seen in FIG. 1. This causes the tapered portion means 23a of rod 23 to become tightly engaged with tapered hole portion 22c of the inner shaft 22. Accordingly, tapered hole portion 22c of inner shaft 22 is uniformly expanded and second spline means 22a around tapered hole portion 22c is closely engaged with first spline means 21a of outer shaft 21 at a selected position. A nut 25 screwed with male screw portion 23b of rod 23 acts as a double nut together with female screw portion means 22f and securely fastens rod 23 with inner shaft 22.

The telescopic shaft 20 according to the present invention is used in a steering system. For this reason, a serrated portion 27 is provided on an outer circumference of the inner shaft 22 for engagement with a steering wheel (not shown). Further, an annular projection 26a, an annular stepped portion 26, and a screw portion 28 are formed on the outer surface of the inner shaft 22. The steering wheel is held by a nut (not shown) which is screwed onto the screw portion 28 and also is maintained on the inner shaft 22 by annular stepped portion 26. A bearing (not shown), fixedly inserted into the annular stepped portion 26, is fixedly located by the annular projection 26a.

Similarly, as shown in FIG. 1, a screw 32, a serrated portion 31, and an annular projection 31a are formed at the left end of the outer shaft 21. Outer shaft 21 is integrally and rotatably connected to a steering gear (not shown).

The operation according to the embodiment of the present invention is as follows:

Rod 23 is inserted into the inner circumferential surface 30 of the inner shaft 22 from the left side in FIG. 1. Male screw portion 23b of the rod 23 is partly screwed into female screw portion means 22f of inner shaft 22 to an extent that first end portion 22b of the inner shaft 22 is not deformed. Nut means 24 has previously been partly screwed into male screw means 21c of outer shaft 21 and the inserting end portion 22b of the inner shaft 22 is fixedly connected with the inserted end portion 21b of the outer shaft 21. The inner shaft 22 is inserted along each spline means 22a, 21a. The inserting end portion 22b of the inner shaft 22 is located near the left end of outer shaft 21 as shown in FIG. 1. The nut means 24 is further screwed onto male screw means 21c of the outer shaft 21 at the inserting position and male screw portion 23b of rod 23 is further screwed into female screw portion means 22f of inner shaft 22.

Accordingly, male screw means 21c of outer shaft 21 is inwardly and elastically deformed through the whole circumference in a substantially uniform manner because slits 21d are symmetrically provided on the outer shaft 21. Rod 23 is moved to the right so that the tapered portion means 23a of the rod 23 becomes deeply engaged with the tapered hole portion 32c of the inner shaft 22. Accordingly, tapered hole portion 22c of the inner shaft 22 is outwardly and elastically deformed in a substantially uniform manner throughout the whole circumference because the slits 22d are symmetrically provided on the inner shaft 22. The portion of first spline means 21a at the male screw means 21c of the outer shaft 21 is closely engaged with the spline portion 22a of the inner shaft 22. The portion of second spline means 22a at the tapered portion 22c of the inner shaft 22 is closely engaged with the spline portion 21a of the outer shaft 21. This results in removing the looseness at the radial direction between the spline portions 21a, 22a of shafts 21 and 22 at the inserted end portion 21b of the outer shaft 21 and the inserting end portion 22b of the inner shaft 22, respectively. The looseness of the inner shaft 22 to the outer shaft 21 at the arrow F direction, the bending direction, is prevented.

Further, inner shaft 22 and outer shaft 21 are slidably held against each other by regulating the screw depth of nut means 24 to male screw means 21c and likewise male screw portion 23b of the rod 23 to female screw portion means 22f. Accordingly, the subject invention provides a telescopic shaft 20 without the clearance between both shafts 21, 22 and is comprised with just these two shafts, 21 and 22.

The clearance is removed at the inserted end portion 21b of the outer shaft 21 and at the inserting end portion 22b of the inner shaft 22, so that the looseness is always prevented between the maximal span of both shafts 21, 22, if the telescopic shaft 20 is adjusted to the desired length by relatively moving both shafts 21, 22. The looseness of the telescopic shaft 20 at the bending direction, shown by arrow F in FIG. 1, is effectively prevented.

When the screw connection of nut means 24 and rod 23 to the male screw portion **23*b* is tightened, both spline portions 21*a*, 22*b* are completely contacted. Thereby, shafts 21 and 22 are axially not relatively movable; the male screw 23*b* of the nut 24 and the rod 23** can be used as locking means.

As has been seen, the present invention provides for a telescopic shaft with first and second depressing means of which first depressing means depresses an inserted end portion of an outer shaft onto an inner shaft and second depressing means depresses an inserting end portion of the inner shaft onto the outer shaft. As a result, the clearance between the shafts is removed at the positions of the first and second depressing means. Moreover, the clearance between the shafts is removed at inserting end portions of each shaft by respective depressing means so that the distance between two positions having no clearance between both shafts is established as long as possible. Therefore, the looseness between both shafts at the radial direction, namely at the bending direction, is sufficiently prevented. According to the present invention, the spline connection between both shafts is obtained at two positions without looseness to improve the prevention of looseness at the rotational direction between the shafts.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicants' general inventive concept.

What is claimed is:

1. A telescopic shaft comprising:

an integral outer shaft, the outer shaft having an integral first inserted end portion and a second end portion;

first spline means on the outer shaft;

an integral inner shaft, the inner shaft having an integral first inserting end portion and a second end portion;

second spline means on the inner shaft for engagement with the first spline means;

first depressing means for depressing and contracting the first inserted end portion of the outer shaft against the inner shaft; and second depressing means for depressing and expanding the first inserting end portion of the inner shaft against the outer shaft, wherein the second depressing means includes a rod extending through the second end of the inner shaft, the inner shaft including an inner circumferential surface for accommodating the rod.

2. A telescopic shaft as claimed in claim 1 including a male screw means formed on the first inserted end portion of the outer shaft, the male screw means having a tapered shape.

3. A telescopic shaft as claimed in claim 2 wherein the male screw means includes a plurality of axial slit means symmetrically provided around the circumference of the male screw means and formed through the whole length of the male screw means and first annular groove means formed on a root portion of the male screw means for decreasing the bending resistance of the male screw means.

4. A telescopic shaft as claimed in claim 3 wherein said annular groove means is in the outer circumferential surface of the outer shaft.

5. A telescopic shaft as claimed in claim 1 wherein the first inserting end portion of the inner shaft includes an axially tapered hole portion.

6. A telescopic shaft as claimed in claim 5 wherein said axial tapered hole portion includes a plurality of axial slit means symmetrically provided around the circumference of the tapered hole portion and formed through the whole length of the tapered hole portion, and second annular groove means formed on a root portion of the tapered hole portion for decreasing the bending resistance of the tapered hole portion.

7. A telescopic shaft as claimed in claim 6 wherein the second annular groove means is in the inner circumferential surface of the inner shaft.

8. A telescopic shaft as claimed in claim 1, wherein said first depressing means includes a nut means.

9. A telescopic shaft as claimed in claim 2, wherein said first depressing means includes a nut means for accommodating the male screw means.

10. A telescopic shaft as claimed in claim 5, said rod having first and second ends, said inner shaft having an inner circumferential surface for accommodating the rod, the first end of the rod including a taper portion means for engaging the tapered hole portion of the inner shaft, wherein the second end of the rod includes a male screw portion, the inner circumferential surface of the inner shaft including a female screw portion means for accommodating the male screw portion of the rod.

* * * * *